Nov. 10, 1931.    P. E. FENTON    1,831,296
SNAP FASTENER
Filed Sept. 11, 1928
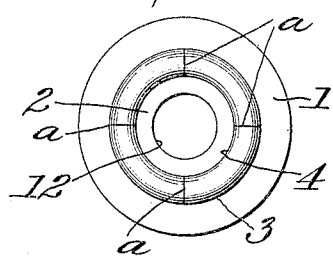
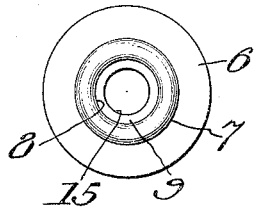
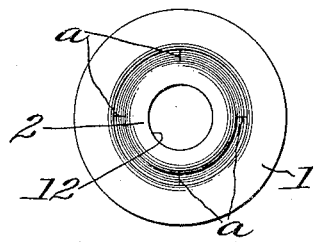
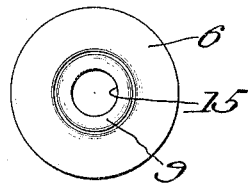
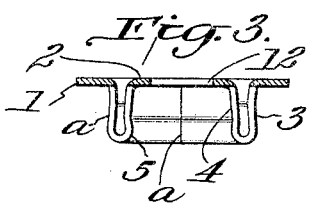
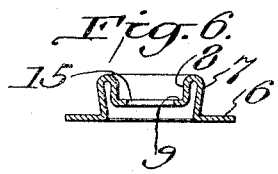
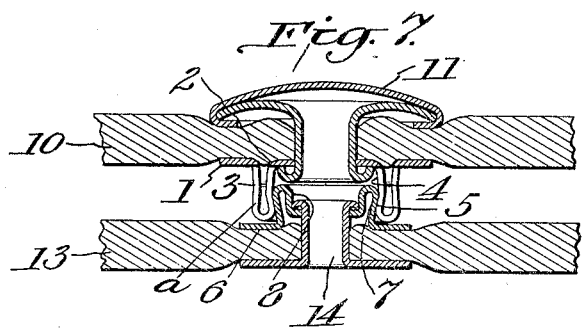
Inventor:
Paul E. Fenton
by
Attorney.

Patented Nov. 10, 1931

1,831,296

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

SNAP FASTENER

Application filed September 11, 1928. Serial No. 305,192.

The object of this invention is to provide a resilient socket member of a snap fastener couple, which is made of one piece and is very sturdy and long-lived.

The invention consists of a one-piece snap fastener socket member, having an outer solid rim, and an inner solid rim which is perforated to receive any suitable device for setting the socket, the outer rim and the inner rim being connected by a double wall which is slotted in the direction of its length down to substantially the level of the rims, but not into such rims, the resilience of the device being obtained by the double slotted wall, as I will proceed now to explain more fully and finally claim.

The broad invention of this application is the same as that claimed in my application of even date, Serial No. 305,191 and this case is designed to claim the specific embodiment of the invention in a socket.

In the accompanying drawings illustrating the invention, in the several figures of which like parts are similarly designated, Figure 1 is a top plan view; Fig. 2 is a bottom plan view, and Fig. 3 is a cross section of the resilient socket of this invention. Fig. 4 is a top plan view; Fig. 5 is a bottom plan view, and Fig. 6 is a cross section of one form of head or stud which may be used as the complemental member of the socket. Fig. 7 is a section illustrating the fastener couple set upon two pieces of material.

The resilient socket comprises an outer non-resilient solid rim 1, and an inner non-resilient solid rim 2, which are located in substantially the same plane and are connected by an outstanding double wall, the parts of which extend in the same direction from the adjacent edges of the inner and outer rims respectively. The outer wall 3 and the inner wall 4 of this double wall, are spaced apart, substantially parallel and are slotted longitudinally, and the slots a end short of the rims. The inner wall 4 is bulged inwardly at 5 so as to form the active stud-engaging element of the socket while the outer wall 3 stands off from the outer rim 1 substantially normal thereto and substantially straight throughout its length.

The head or stud may be of any usual or approved construction. As shown in Figs. 4, 5, 6 and 7, the head or stud is a one-piece structure, having a laterally extending base flange 6, from the center of which rises an outwardly inclined wall 7 which is reverted at 8, and terminates in an inner perforated rim 9.

As shown in Fig. 7, the socket may be secured to an object 10 by means of a capped eyelet 11, the barrel of which is passed through a hole in part 10 and the hole 12 in the inner rim 2 and clinched against the undersurface of said rim. The head or stud may likewise be set upon an object 13 by a post 14, passed through a hole in the object 13 and the central hole 15 in the rim 9.

It will be seen by reference to Fig. 7, how the inward bulge 5 of the inner wall 4 of the socket engages the outwardly inclined wall 7 of the stud to effect a union of the snap fastener couple.

It will be understood, of course, that the use of the resilient socket of this invention, is not confined to the head or stud member shown, but is applicable to other head or stud members.

The slotting of the double wall does not extend into the outer rim or the inner rim, and the resilience, therefore, of the double wall is stiff, resulting in a very sturdy and a long-lived snap action under the strains and stresses of use.

The slotting of the double wall leaves a solid rim around the outside, which furnishes a support for the outer wall, and also a solid rim in the center which furnishes a support for the inner wall, as well as provides means for attaching or setting the device.

The construction is economical to manufacture, being in one piece, and is sturdy because the inner wall acts as an auxiliary unit to the outer wall and provides a long-lived snap action; and also provides a support for the outer wall which prevents crushing under the damaging effects of laundering.

Variations in the details of construction are permissible within the principle of the invention and the scope of the claims following.

What I claim is:—

1. A reslient snap fastener socket, having an outer rim and an inner rim arranged in substantially the same plane, both of which rims are non-resilient, the inner rim having a hole to receive a socket attaching element, and a stud-engaging structure composed of an inner wall and an outer wall spaced apart and offstanding from and connecting said rims and in one piece with them and themselves integrally connected, both of said walls being slotted longitudinally short of the rims and thereby rendered stiffly resilient, the active stud-engaging portion of the inner wall being budged inwardly and the outer wall being normal to the rims and substantially straight throughout its length.

2. A snap fastener, comprising a non-resilient or rigid stud member, and a resilient socket member adapted to engage the stud member, the socket member composed of a non-resilient outer rim and a non-resilient inner rim arranged in the same plane, said inner rim having a hole to receive an attaching element, and an inner and a outer walled stud-engaging structure offstanding from and connecting the rims and in one piece with them and themselves integrally connected, said walls being slotted longitudinally short of the rims and thereby rendered stiffly resilient, the active stud-engaging portion of the inner wall being bulged inwardly, the outer wall being normal to the rims and substantially straight throughout its length.

In testimony whereof I have hereunto set my hand this 10th day of September A. D. 1928.

PAUL E. FENTON.